Dec. 8, 1942.  F. W. KELLEHER  2,304,460
DIAL TEST INDICATOR
Filed July 2, 1940

Witness
Paul F. Bryant

Inventor
Francis W. Kelleher
by his attorneys
Fish, Hildreth, Cary & Jenney

Patented Dec. 8, 1942

2,304,460

UNITED STATES PATENT OFFICE 2,304,460

DIAL TEST INDICATOR

Francis W. Kelleher, Lynn, Mass., assignor of one-half to Robert F. Gifford, Bournedale, Mass.

Application July 2, 1940, Serial No. 343,582

4 Claims. (Cl. 248—124)

The present invention relates to dial test indicators, and more particularly to a mounting for the same.

The objects of the present invention are to provide a simple and inexpensive form of mounting adaptable to standard types of instruments, which will not only increase very substantially the range of adjustment of the instrument, but also facilitate such adjustment and use by the operator.

With these objects in view the present invention consists in the combination of a dial test indicator with a mounting for the same, comprising a ball and socket connection arranged to permit universal adjustment of the indicator within a wide range, and clamping means for such connection distantly controlled therefrom to provide a clear view by the operator and free manipulation of the indicator while the same is being adjusted and also when being used.

Figure 1:
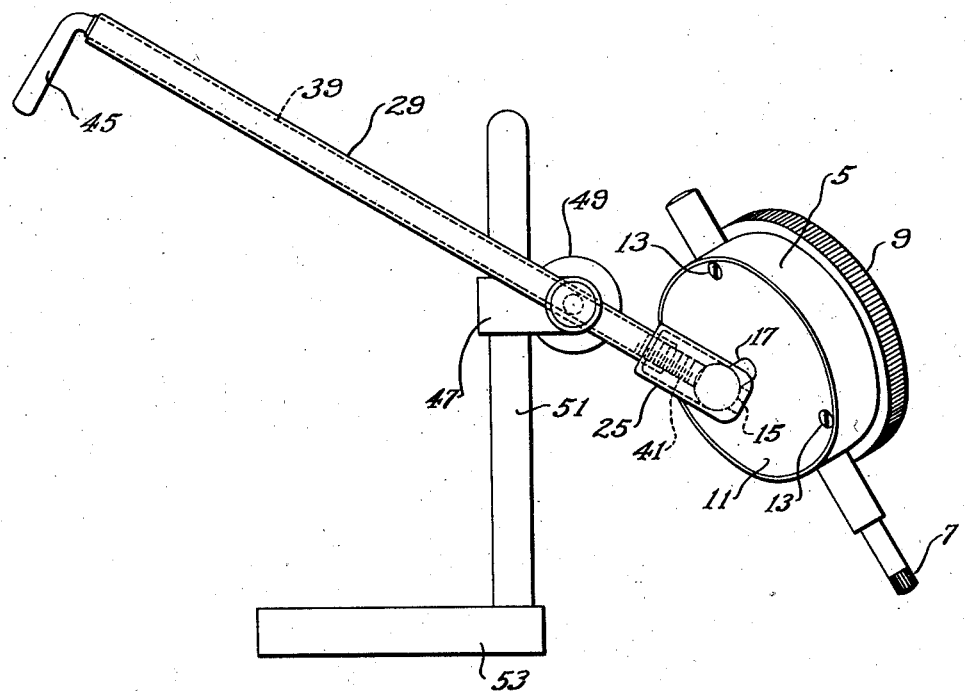
Figure 2:
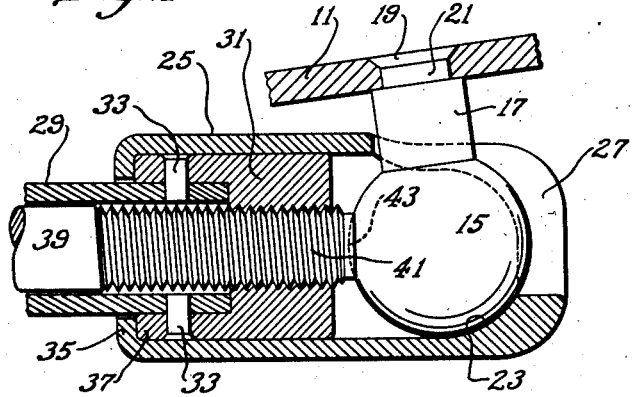
Figure 3:
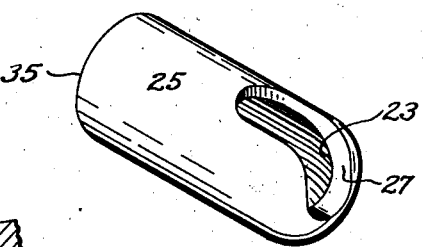

In the accompanying drawing, which illustrates what is now considered to be the preferred form of the present invention as applied to an indicator of standard type, Fig. 1 is an elevation showing the indicator in back view assembled upon the mounting; Fig. 2 is a transverse sectional view of the ball connection and clamping devices, on an enlarged scale; and Fig. 3 is a perspective view of the socket member for the ball connection, on a somewhat larger scale than Fig. 1.

Briefly, the indicator shown in Fig. 1 is provided with a ball member on the back of its case, which member is positioned in a socket member rotatably mounted upon the front end of an extended tubular support. Within such support is positioned a clamping rod shaped at its front end to clamp the ball and at its rear end extending from the tubular member and having an actuating handle. The tubular member is adjustably mounted in the usual clamping device, adjustable upon an upright rising from a pedestal adapted to be clamped or otherwise positioned upon a suitable support or machine. The socket member is provided, as shown in Fig. 3, with a slot extending from the end thereof around its side, thereby providing for an adjustment through over 90° of the indicator with respect to the socket member. Since the latter is rotatable upon the tubular support, the indicator becomes universally adjustable through a range of over 180° in all directions.

Describing the apparatus in more detail, the indicator comprises the cylindrical case 5 with the usual feeler or detector 7 extending radially therefrom, with the usual front cover 9 and rear closure 11, removably secured in the casing by screws 13. Fixed upon this closure and extending rearwardly therefrom is a ball member comprising a ball 15 upon the rear end of the cylindrical stem 17 fixed in the closure. Conveniently the front end of the stem is fixed, as shown in Fig. 2, by swaging or riveting at 19 the reduced portion 21 of the stem 17 into the enlarged inner end of a bore or opening through the casing closure.

The ball is seated against the inner spherical surface 23 of the cylindrical socket member 25, the stem 17 of the ball member extending through the slotted opening 27 extending from the front end of the socket member to the side thereof, thus providing a range of angular adjustment of the ball member in the socket member of something over 90°.

The socket member 25 is rotatably mounted at the front end of the extended or long tubular support 29, being free to turn upon the threaded sleeve 31 fixed upon the front end of such support. This sleeve is counter-bored to receive the end of the tubular support and is pinned thereon by the short pins 33. The socket member is held on the threaded sleeve 31 by bending or crimping the open end 35 of said member over the end or shoulder 37 of the socket member after the parts have been assembled.

The ball is clamped against the spherical bearing surface 23 by means of the clamping rod 39 extending the length of the tubular support 29 and projecting from the front and rear ends thereof. The front end is threaded at 41 to engage the internal threads of the sleeve 31, while the front extremity of the rod is formed with a concave face at 43 to engage the ball. The rear end of the rod 39 is provided with the handle or finger 45 whereby the rod may be rotated to advance and retract the same through the threaded sleeve to clamp and unclamp the ball against its socket bearing. The tubular support 29 is carried by the conventional clamping sleeve 47 with the thumb nut 49 for tightening the sleeve both upon the tubular support 29 and also upon the upright 51 rising from the pedestal or base 53.

In assembling the mounting with a common or standard form of indicator, such as is shown in the drawing, the screws are removed to permit the back closure to be taken off the casing. This closure is then bored and counterbored to fit the stem of the ball. The socket member, ball member and rear closure are permanently assembled together, the socket member at this time having its rear end extending straight and not turned inwardly, and this is accomplished by passing the ball member through the open end of the socket member and the stem through the slot. The reduced end of the stem is then inserted in the bore or opening in the rear closure of the casing and the end riveted or peened over.

The internally threaded sleeve 31 is next fitted upon the front end of the tubular support 29 and permanently secured therein by the pins 33. The open end of the socket member is then slipped over the threaded sleeve, and the end of such member bent or turned over as shown in Fig. 2, thus permanently securing the above mentioned parts together. The tubular support is next passed through the clamping sleeve 47 and the clamping rod 39 inserted through the rear open end of the tubular support and its threaded forward end screwed onto the threaded opening in the sleeve 31.

The test indicator and its mounting are now ready for use. Assuming the indicator is to be used in connection with general turning or boring work upon a lathe, the pedestal may be clamped or otherwise secured in or on the tool carriage in convenient position with respect to the work. By turning the handle or finger 45 of the clamping rod slightly in an anti-clockwise direction, the ball will be released and the gage may be adjusted by the operator to bring the finger or feeler 7 to the exact position desired, a slight turning of the locking rod in the opposite direction locking the ball and the indicator securely in the adjusted position.

It will be noted that due to the ball and socket mounting of the indicator upon the support with the ball stem extended through the slot 27 and the socket member 25 rotating upon the threaded sleeve 31, the indicator and its feeler may be universally adjusted through a wide range, something over 180°. Furthermore, the locking of the indicator in position is accomplished at a point distant from the gage so that not only will there be not interference between the hands of the operator in adjusting and locking the indicator, but the vision of the operator at such times will in no way be interfered with.

It will also be noted that the parts making up the mounting for the gage are small and of simple construction, permitting a clear view of the gage at all times when in use, greatly facilitating the use of the indicator by the operator both as to time required and accuracy secured. While there are two adjusting movements provided, namely, that of the ball 15 on its socket 23 and of the socket member 25 on the threaded sleeve 31, both movements are controlled by the single locking device which, when loosened, permits this free universal adjustment of the indicator above described, and when tightened holds the indicator in its adjusted position, restrained from movement in all directions.

While the drawing illustrates and the specification describes what is now considered to be the preferred form of the present invention as applied to a certain type of indicator, it is to be understood that the form and arrangement of the parts may be varied, if desired, within the scope of the appended claims, and the mounting may be used in the disclosed or modified forms with other types of indicators.

Having thus described the invention, what is claimed is:

1. In a dial test indicator, the combination with the indicator casing, of means including a ball fixed upon the casing, an extended tubular support, a mounting for the support having provision for securing the support thereto, an axially disposed socket member mounted upon the support for rotational movement independent of axial movement, said member having an internal spherical bearing surface, a clamping rod within the tubular support and co-axially disposed with relation thereto and having a clamping face at its front end for engaging the ball, its rear end projecting from the tubular support, and having actuating means for actuating the rod to clamp the socket member and ball from movement.

2. In a dial test indicator, the combination with the indicator casing, of a ball member fixed therein, the member comprising a ball and a supporting stem, a socket member having an internal spherical bearing face and a slot comprising axial and radial portions to receive the stem of the ball, a hollow support for supporting the socket member for rotational movement thereon independent of axial movement, a mounting for the support having provision for securing the support thereto, rotatable means positioned within the support and provided at one end with a concave face for clamping the ball against the spherical face of the socket member and locking said member from rotation on said support, and at the other end with an actuating device distantly spaced from the ball and socket member for rotating said means to clamp the ball and lock the member in position.

3. In a dial test indicator, the combination with the indicator casing, of a ball member carried thereby, said member comprising a ball and a supporting stem fixed to the casing, an extended tubular support having at its front end a socket member mounted upon the support for rotational movement independent of axial movement and provided with an internal spherical bearing for the ball, said member having a slot for the ball stem of a length and so disposed to permit the stem to be variably adjusted from an axial to a radial position in said sleeve, a mounting for the support having provision for clamping the support thereto midway the ends of the support, and means for clamping the ball against the internal spherical surface of the socket member to hold said socket member and ball from movement, said means comprising a threaded rod mounted in the tubular support having a ball engaging face at its front end and actuating means at its rear end.

4. In a dial test indicator, the combination with the indicator casing having a removable back closure, of a ball member comprising a ball and a supporting stem therefor mounted upon and extending rearwardly from said closure, supporting means for the ball member comprising an extended tubular support, a mounting for the support having provision for clamping the support thereto midway the ends of the support, an internally threaded sleeve surrounding and fixed upon the front of the tubular support, the rear end of the sleeve being formed with an annular shoulder, a cylindrical socket member mounted upon the internally threaded sleeve for rotational movement independent of axial movement and provided at its front end with an internal spherical socket bearing for the ball and with a parallel sided slot extending from the front end to the side of the sleeve to receive the ball stem, the rear end of the sleeve being turned radially inwardly to engage the shoulder on the threaded sleeve, and a clamping rod extending through the tubular support, threaded at its front end to engage the internally threaded sleeve and having a spherically concave face to engage the ball, its rear end extending beyond the tubular support and being provided with means for turning the same to clamp the ball between the spherical faces of the clamping sleeve and threaded rod to lock the socket member upon the sleeve and thereby secure the indicator in adjusted position.

FRANCIS W. KELLEHER.